Sept. 9, 1930.   L. J. GRUBMAN   1,775,393
TOOL FOR MILLING EYE SOCKETS IN DOLL HEADS
Filed May 23, 1925   3 Sheets-Sheet 1

INVENTOR
Leo J. Grubman
BY
his ATTORNEY

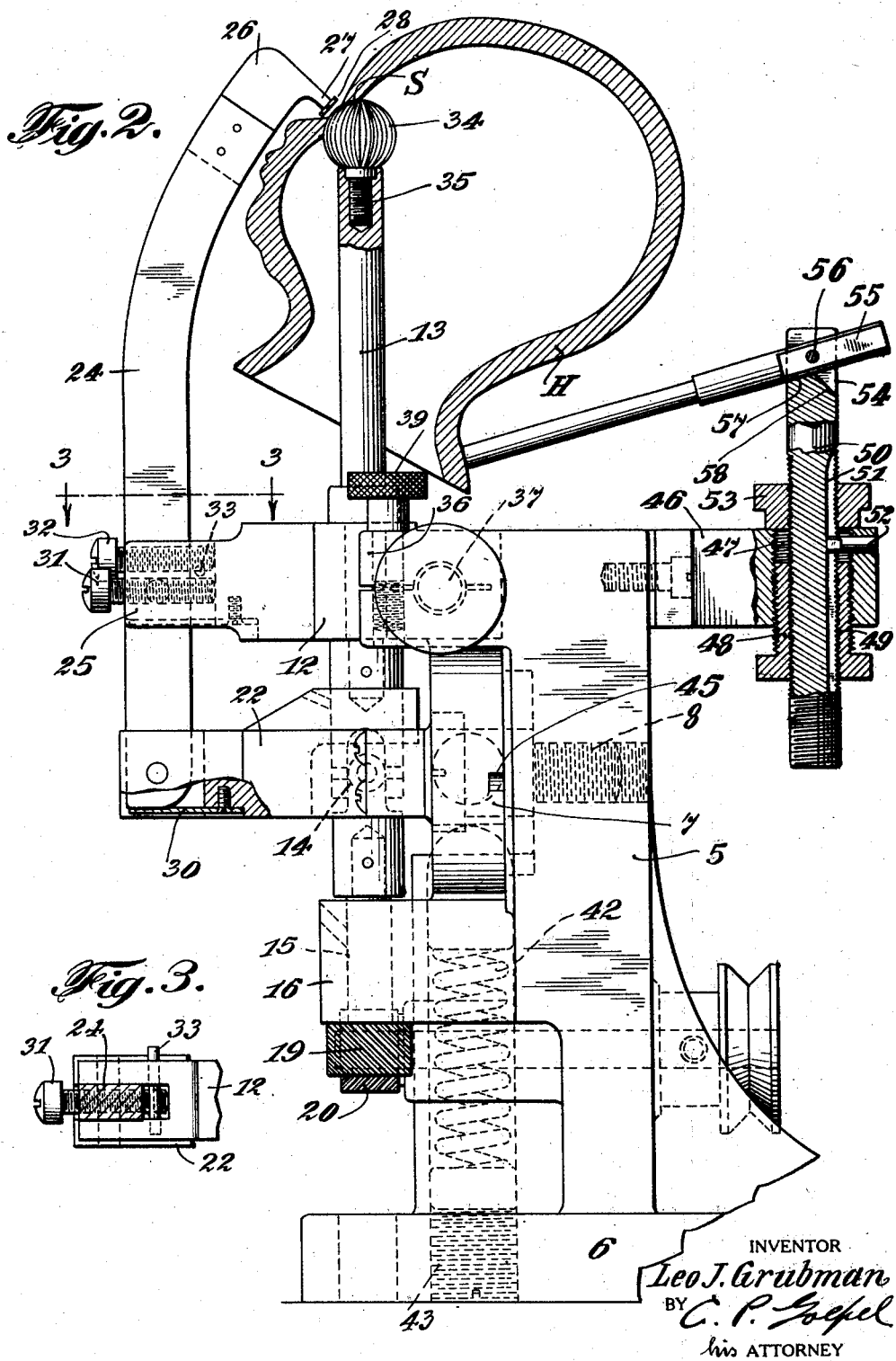

Sept. 9, 1930.  L. J. GRUBMAN  1,775,393
TOOL FOR MILLING EYE SOCKETS IN DOLL HEADS
Filed May 23, 1925    3 Sheets-Sheet 3

INVENTOR
Leo J. Grubman
BY
his ATTORNEY

Patented Sept. 9, 1930

1,775,393

UNITED STATES PATENT OFFICE

LEO J. GRUBMAN, OF BELLE HARBOR, NEW YORK

TOOL FOR MILLING EYE SOCKETS IN DOLL HEADS

Application filed May 23, 1925. Serial No. 32,301.

This invention relates to an improved tool for milling eye sockets in doll heads, and has for its primary object to provide a relatively simple tool whereby this operation may be expeditiously and accurately performed.

Heretofore, the milling or reaming of eye receiving sockets in the wall of the doll head was done before the doll head was fully completed. The head is usually molded in front and rear sections, and before these sections are permanently joined, the spaced eye openings are formed through the wall of the front section and the inner face of said wall at each of the openings therein, then reamed or milled out to form a concave seat or socket. These sockets are separately formed, and it is an exceedingly difficult matter to exactly center the eye receiving socket with the center of the opening through which the eye member to be subsequently mounted in said socket is visible. This results in a more or less imperfect simulation of the movement of the human eye in the completed doll.

It is the primary object and purpose of my present invention to provide a milling tool whereby the walls of these eye receiving sockets may be centered with absolute accuracy with respect to the openings in the head wall and said sockets simultaneously formed after the doll head has been fully completed in so far as its structure is concerned. More particularly, I provide a tool wherein spaced milling cutters are mounted and arranged for insertion through the neck of the completed doll head into centered relation with the respective eye openings, and said cutters then simultaneously operated to mill out or cut the wall of the doll head contiguous to the edges of the openings to precisely the same extent, thus insuring uniformity in curvature of the walls of the two eye receiving sockets and thereby making it possible to locate or position the two eye members in precisely the same relation to the socket walls.

Further important objects of my present improvements reside in the provision of simple and easily operable means for adjusting one of the milling cutters with respect to the other; the provision of a gauge device associated with each of the milling cutters whereby the cutters may be accurately centered with relation to the eye opening, and a simple and compact arrangement of the several parts of the tool with the operating means therefor.

With the above and other objects in view, the invention consists in the improved tool for milling eye sockets in doll heads, and in the form, construction and relative arrangement of the several parts thereof as will be hereinafter more fully described, illustrated in the accompanying drawings, and subsequently incorporated in the subjoined claims.

In the drawings, wherein I have illustrated one simple and practical embodiment of the invention, and in which similar reference characters designate corresponding parts throughout the several views,—

Fig. 2 is a side elevation of the tool;

Fig. 3 is a detail sectional view taken on the line 3—3 of Fig. 2, and

Figure 1:
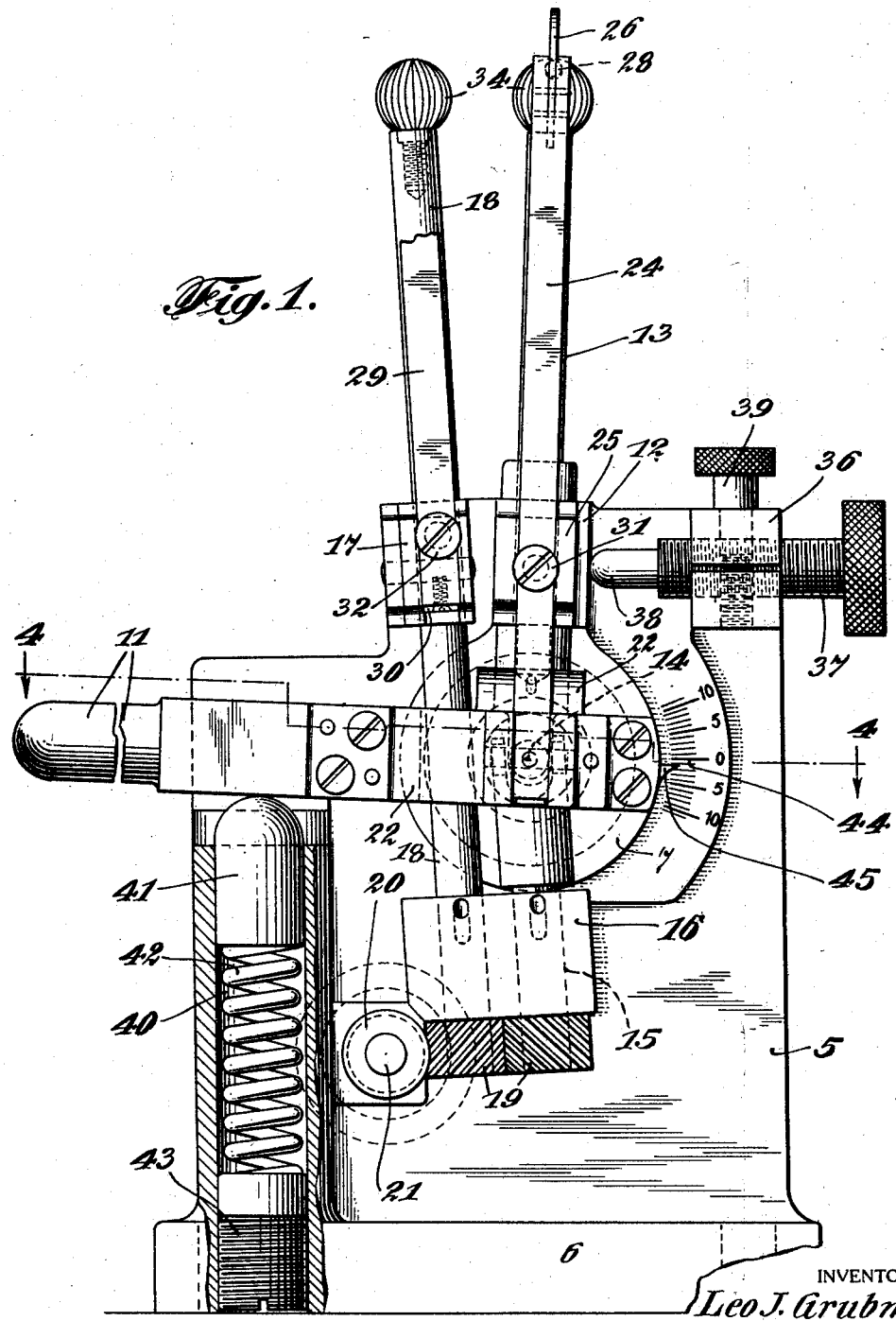
Figure 1 is a front elevation partly in section showing a preferred embodiment of my present improvements.
Figure 4:
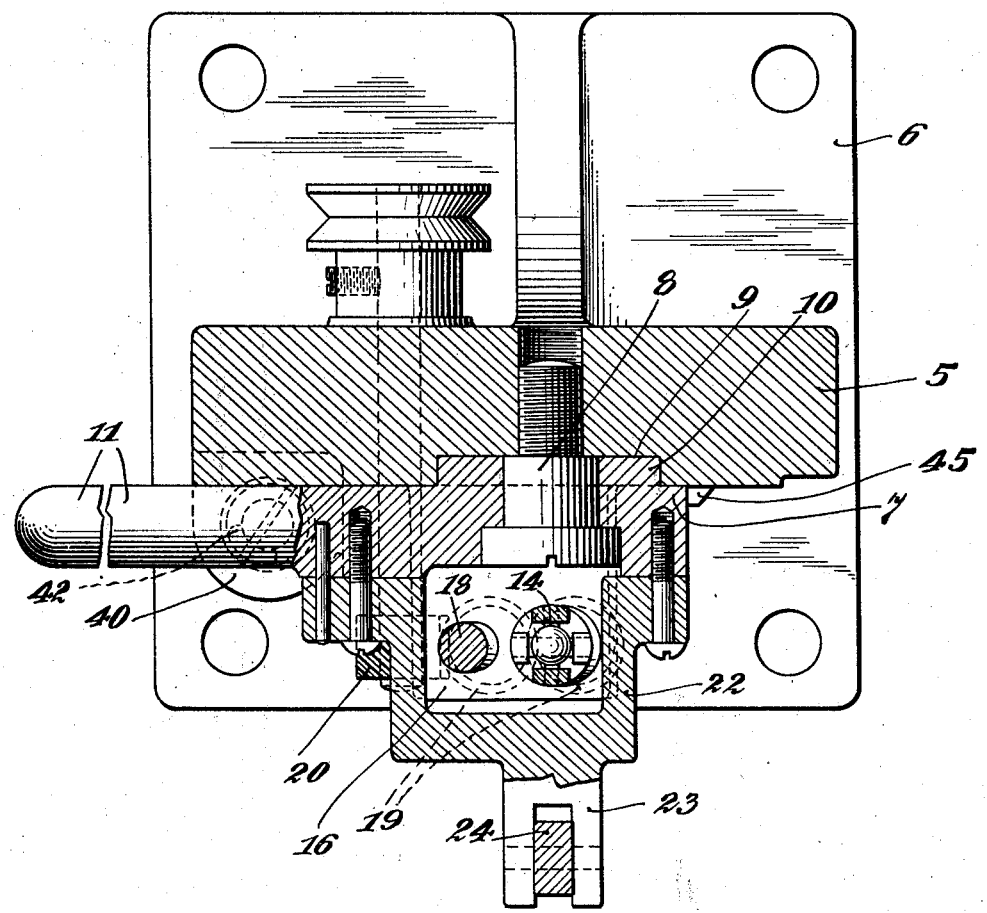
Fig. 4 is a horizontal section taken on the line 4—4 of Fig. 1.

Referring in detail to the drawings, for purposes of illustration, I have shown the several operative parts of the tool mounted upon a suitable supporting standard 5 rising from a base 6 which may be bolted or otherwise suitably anchored upon a bed, bench or other foundation.

Upon one side of the supporting standard 5 a disc or plate 7 is rotatably supported upon a stud 8, threaded or otherwise fixed in said standard. The face of the standard is recessed as at 9 to receive a boss 10 on one side of the plate 7. A suitable laterally projecting handle 11 is attached to or integrally formed with the plate 7.

The rotatably mounted plate 7 is also provided at the upper side thereof with a horizontally disposed forwardly projecting arm 12. In this arm a vertically positioned shaft 13 is journalled at its lower end, and said lower end of the shaft 13 is connected by a flexible or universal joint 14 with the upper end of a relatively short shaft 15 which is mounted in a bracket 16 projecting from the face of the standard 5. It will be noted that the point of intersection of the axes of the universal joint 14 is located coincident with the axial center of the supporting stud 8 for the plate 7. It will thus be understood that when the plate 7 is rotated as hereinafter explained, the shaft 13 moves therewith and with relation to the lower shaft 15.

At one side of the arm 12, a similar arm 17 projects forwardly from the standard 5 and in this arm a second shaft 18 is rotatably held, said shaft being mounted at its lower end in the bearing bracket 16. This lower end of the shaft 18 is operatively connected with the shaft 15 by means of the spiral gears 19. The gear on the shaft 18 is engaged with a similar gear 20 on one end of shaft 21 mounted in the standard 5, the other end of this shaft being connected by any suitable means with a motor or other source of power. It will therefore, be understood that the shaft 18 is driven in one direction while the other shaft 13 is driven through the shaft 15 and the universal joint 14 in a relatively opposite direction.

Upon the plate 7, a diametrically extending U-shaped bracket member 22 is fixed at its ends, said bracket embracing the flexible or universal joint 14 and the shaft 18. This bracket is provided with a bifurcated lug 23 in which the lower end of a lever 24 is pivotally mounted. The end of the arm 12 is also bifurcated as at 25 to receive said lever and the upper end of the lever is curved and has a plate 26 fixed thereto terminating in a laterally projecting finger 27 carrying a small gauge disc 28. A similar lever 29 is also pivotally mounted at its lower end in the arm 17 on the standard 5 and is likewise provided with a gauge device corresponding to that above referred to. Each of these levers is yieldingly held against pivotal movement in one direction by means of a leaf spring 30 bearing against the lower end of the lever at its free end and having its other end fixed to the arm 12 or 17 as the case may be. Each lever carries an adjusting screw 31, 32 respectively, bearing against the arms 12 and 17 whereby the levers 24 and 29 may be independently adjusted with relation to a transversely positioned stop pin 33 fixed in each of the arms 12 and 17 which limits the inward movement of the lever.

Upon the upper ends of the shafts 13 and 18, the spherical milling cutters 34 are detachably mounted. Thus each of these cutters may be provided with a threaded stem 35 for engagement in a threaded socket in the upper end of each shaft.

A horizontally split lug 36 on the upper end of the standard 5 is provided with a threaded opening to receive the adjustable screw 37 having a reduced end 38 bearing against one side of the arm 12 on the plate 7. A vertically positioned clamping screw 39 connects the ends of the split lug 36 whereby the same may be tightly clamped upon the screw 37, and the latter thus fixed in its adjusted position.

At the opposite side of the plate 7 the standard 5 is formed with a vertically disposed guide 40 for a plunger 41. As herein shown, this guide means is illustrated in the form of a hollow projection on the face of the standard in the upper end of which the plunger 41 is movably arranged and yieldingly projected therefrom by the coil spring 42, the lower end of which is engaged with an adjustable plug 43 threaded in the base 5. The upper end of the plunger 41 is rounded or convex and bears against the lower edge of the handle lever 11 projecting from the plate 7. It will therefore, be understood that the spring 42 and plunger 41 act to rotate the plate 7 in one direction and yieldingly hold the arm 12 thereof in bearing engagement against the end 38 of the adjustable stop screw 37. The position of this adjustable stop on the standard with respect to a vertical plane passing through the axis of the plate 7, thus determines the distance between the axial centers of the milling cutters 34 on the upper ends of the shafts 13 and 18. When it is desired to change this spacing of the milling cutters, the clamping screw 39 is released and the stop 37 adjusted in the lug 36, thus moving the shaft 13 and the milling cutter thereon with respect to the relatively stationary shaft 18 and the milling cutter on the upper end thereof.

For the purpose of accurately spacing the milling cutters in accordance with the distance between the centers of the eye openings in the wall of the doll head to be operated upon, I provide a degree scale upon the face of the standard 5 as shown at 44 and an index pointer or projection 45 on the edge of the rotatable plate 7.

Having now described the several structural features of the milling tool, its operation may be explained as follows.

After first ascertaining the distance between the centers of the spaced eye openings in the doll head wall and adjusting the milling cutters 34 accordingly in the manner above explained, the screws 31 are operated to adjust the gauge discs 28 with relation to the respective milling cutters and in accordance with the thickness of the doll head wall. The completely formed doll head indicated at H is then arranged in position, the two shafts 13 and 18 passing upwardly through the neck of the doll head. The operator then adjusts the position of the doll head with the inner surface of its front wall in contact with the spherical milling cutters until the gauge discs 28 are accurately centered with relation to the respective eye openings in said wall.

For the purpose of assisting the operator in centering the milling cutters with respect to the eye openings and to retain the doll head in its adjusted position against casual movement, I provide an adjustable stop or rest. As herein shown a bracket 46 projects laterally from the upper end of the standard 5 at the rear side thereof and is provided with a vertically extending opening 47, the wall of which has a left hand thread to receive the exterior left hand threads of an adjustable bushing 48. This bushing also has an internal right hand thread indicated at 49 to receive the lower correspondingly threaded portion of a vertically disposed rod or post 50. This threaded section of the post is provided with a longitudinally extending key way 51 to receive a pin or key 52 fixed in the bracket arm 46 and projecting into the upper end of the opening 47. Above the bracket arm a lock nut 53 is threaded on the post 50.

The upper end of the post 50 is slotted or bifurcated as at 54 and a stop rod or rest 55 is pivotally mounted therein upon the pin 56. At the lower end of the bifurcation 54 the post 50 is provided with obliquely inclined surfaces 57 and 58 respectively. The surface 57 supports the stop 55 in its operative position while the surface 58 limits the pivotal movement of said stop to an inoperative position.

As shown in Fig. 2 of the drawings, the stop 55 may be readily adjusted with respect to the gauge discs 28 by turning the bushing 48 whereby the post 50 is caused to move vertically therethrough. The post is then securely locked in such adjusted position by means of the nut 53 which is threaded downwardly upon the post into engagement with the bracket 46. As shown in Fig. 2 of the drawings, the neck wall of the doll head H at its rear side is adapted to bear against the end of the stop 55, said stop being properly adjusted after the adjustment of the gauge device 27 to accurately center the same with relation to the eye opening in the head wall and with respect to the milling cutter 34. Thus, with the hand of the operator engaged upon the rear part of the doll head, the stop 55 provides a firm bearing or rest for the neck end of the doll head so that no accidental or casual shifting movement of the head with respect to the milling cutters after they have been properly centered with relation to the eye openings, will occur.

The motor or other power means is then started in operation, whereby rotation is transmitted through the gearing 19 and 20 to the shafts 13 and 18, the milling cutters operating upon the inner side of the head wall to form the concave seats or sockets therein as indicated at S which receive the respective eye members of the oscillatory mounting to be subsequently positioned within said head. Thus, it will be seen that the two eye receiving sockets are simultaneously milled or reamed out in the doll head wall, and by the provision of the gauge devices 28 operating in conjunction with the stop 55, the eye openings in the doll head wall may be accurately located radially with respect to the milling cutters so that an even and uniform cutting action upon the wall of the doll head is assured and the socket walls thus produced will bear the same relation to the edge of each eye opening at the outer surface of the head wall. Accordingly, when the oscillatory eye mounting is arranged within said head, the pupils of the respective eye members will bear the same relation to the edges of the eye openings and in the oscillatory movement of said eye members will realistically simulate the opening and closing movements of the human eye.

From the above description considered in connection with the accompanying drawings, it will be seen that I have devised a tool of relatively simple construction whereby the eye member receiving sockets may be expeditiously and accurately milled or reamed in the wall of the doll head, after the head has been completely formed and closed with the exception of the opening through the neck. Accordingly, the quantity production of such dolls may be materially increased by the use of my improved tool and with greater economy since waste due to the faulty or inaccurate reaming or milling of the eye sockets will be eliminated. It follows from the fact that by the use of my new tool, exactly the same curvature of the socket walls and their relation to the eye openings is attained in all of the doll heads, that the eye mounting is interchangeable and may be removed from one head and placed in another with the assurance of a correct relationship between the respective eye members and the walls of the eye sockets.

I have herein disclosed a practical embodiment of my present improvements which I have found to be very efficient in its operation. Nevertheless, it is to be understood that the essential features of the device might also be incorporated in various other alternative mechanical constructions, and I therefore reserve the privilege of adopting all such legitimate changes in the form, proportion and relative arrangement of the several parts as may be fairly embodied within the spirit and scope of the invention as claimed.

I claim:

1. A tool of the character described comprising a pair of shafts adapted to be engaged through the neck of a completely formed doll head, a milling cutter on each shaft, means for adjusting one of said shafts with respect to the other to space the milling cutters in accordance with the distance between the centers of spaced eye openings in the doll head wall, an adjustable lever associated with each of said shafts and means for adjusting said lever, a gauge device carried by each lever and spaced from the milling cutter thereon for centering the cutter with respect to the eye opening, and means for simultaneously operating said shafts with the cutters in contact with the inner side of the head wall to form eye member receiving sockets therein.

2. A tool of the character described comprising a rotatably mounted plate, a shaft carried thereby, a second shaft arranged in a relatively fixed position with respect to said first named shaft, a milling cutter on each of said shafts, means for rotating said plate to adjust the position of the first named shaft with respect to the second named shaft and vary the distance between the milling cutters in accordance with the distance between the centers of eye openings in the wall of a doll head, and means for simultaneously rotating said shafts with the milling cutters in contact with the doll head wall to form eye member receiving sockets in said wall.

3. A tool of the character described comprising a rotatably mounted plate, a shaft carried by said plate, a second relatively fixed shaft, a milling cutter on each of said shafts, means yieldingly acting to rotate said plate in one direction, adjustable stop means for limiting such movement of the plate to thereby space the milling cutters with respect to each other in accordance with the distance between the spaced eye openings in the wall of a doll head, and means for simultaneously operating said shafts with the milling cutters in contact with the doll head wall to form eye member receiving sockets therein.

4. A tool of the character described comprising a rotatably mounted plate, a shaft carried by said plate, a second relatively fixed shaft, a milling cutter on each of said shafts, means yieldingly acting to rotate said plate in one direction, adjustable stop means for limiting such movement of the plate to thereby space the milling cutters with respect to each other in accordance with the distance between the spaced eye openings in the wall of a doll head, an adjustable gauge device associated with each of the milling cutters for positioning said cutters with relation to the centers of the respective eye openings, and means for simultaneously operating said shafts with the milling cutters in contact with the doll head wall to form eye member receiving sockets therein.

5. A tool of the character described comprising a pair of milling cutters, means for supporting said milling cutters through the neck of a completely formed doll head, means for centering the milling cutters with respect to spaced eye openings in said wall and in contact with the inner side of the head wall, said means including relatively adjustable gauge devices associated with the respective milling cutters and a stop with which a part of the head wall is adapted to be engaged to locate the eye openings with respect to the milling cutters, and means for simultaneously operating said milling cutters.

6. In a tool of the character described, a pair of shafts, milling cutters mounted at one end thereof and therewith movable, said shafts with cutters being adapted for insertion through the neck of a completely formed doll head, means normally acting to hold said shafts with cutters in spaced apart relation but permitting of the movement of one shaft with its cutter towards the other shaft with its cutter whereby the same may be inserted through a neck opening of relatively small size, said shafts adapted to be positioned to bring their cutters in operative contact with the doll head wall in opposed relation to spaced eye openings therein, a gauge device associated with each of the shafts, said gauge devices having a constant definite relation to the shafts and adapted to be centered with relation to the respective eye openings exteriorly of the doll head wall, and means for simultaneously operating said shafts to form eye member receiving sockets in said wall.

7. In a tool of the character described, a pair of pivotally supported gauge devices, and means engaging said gauge devices whereby to space them in centered relation to the spaced eye openings in a doll head wall at the outer side of said wall to thereby determine the operative location of a milling cutter in contact with the inner side of the head wall to form an eye member receiving socket therein accurately centered with respect to an eye opening.

8. In a tool of the character described, a shaft with a milling cutter adapted for insertion through the neck of a completely formed doll head, a pair of pivotally supported gauge devices adapted to be positioned exteriorly of the doll head wall, and means engaging said gauge devices for adjustably spacing them on their pivots in accordance with the distance between the centers of spaced eye openings in said wall whereby said shaft may be positioned to bring its milling cutter in operative contact with the inner side of the head wall to form an eye member receiving socket therein in accurately centered relation to one of the eye openings.

In testimony that I claim the foregoing as my invention, I have signed my name hereto.

LEO J. GRUBMAN.